March 28, 1961  G. E. BARNHART  2,977,167
SEAL MEANS

Filed May 10, 1957   3 Sheets-Sheet 1

INVENTOR
GEORGE E. BARNHART
BY
Mason & Graham
ATTORNEYS

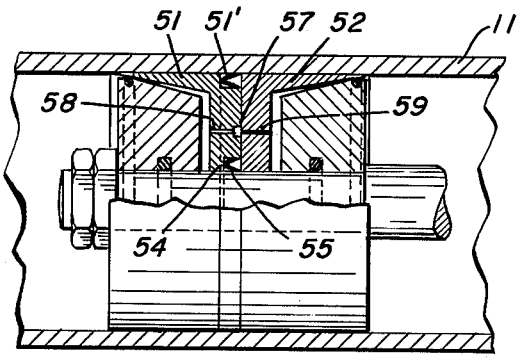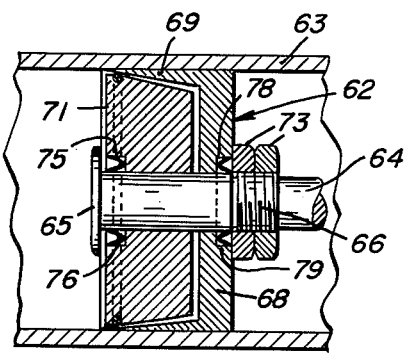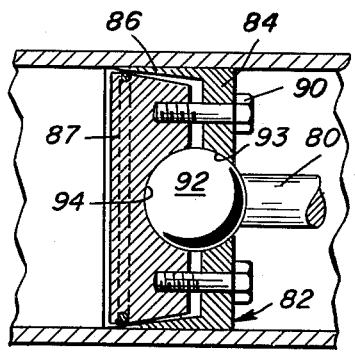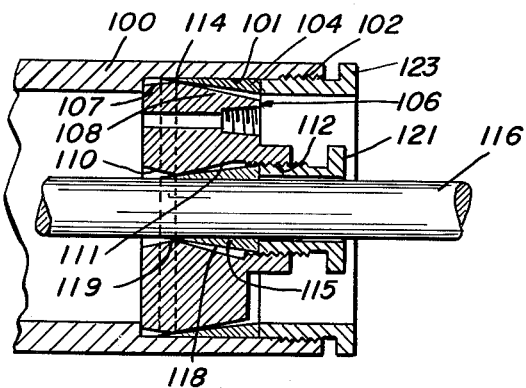

March 28, 1961 G. E. BARNHART 2,977,167
SEAL MEANS

Filed May 10, 1957 3 Sheets-Sheet 3

INVENTOR
GEORGE E. BARNHART
BY
Mason & Graham
ATTORNEYS

United States Patent Office 2,977,167
Patented Mar. 28, 1961

2,977,167

SEAL MEANS

George E. Barnhart, 2228 New York Drive, Altadena, Calif.

Filed May 10, 1957, Ser. No. 658,268

26 Claims. (Cl. 309—33)

This invention has to do with seal means useful for effecting a fluid-tight seal between relatively stationary or relatively movable parts.

In recent years there have been increasing instances where piston and cylinder mechanisms having low resistance to movement are required. This has necessitated, to a large extent, the use of highly precise metal-to-metal fits between the parts, entailing expensive, close-tolerance machining which is beyond the capacity of most machine tools and beyond the ability of many machinists to produce.

It is, therefore, an object of my invention to provide a novel seal means embodied in a piston construction designed particularly to meet this problem wherein a metal-to-metal running fit can be obtained between a piston and cylinder, or similar parts, without entailing extremely accurate machining to close tolerances as normally required to accomplish this, and wherein there is relatively low friction between the parts.

More particularly it is an object to provide a novel piston construction which remains relatively free of the piston when the parts are at rest and not subject to high fluid pressure but which is designed to automatically expand at at least one of its ends into close-fitting sliding sealing engagement with the cylinder during operation.

It is a further object to provide a piston construction suitable for pistons in which an outer member may be made of several different types of metals and one wherein the outer member is in part expanded slightly by an inner member in conjunction with the pressure of fluid against the inner member or from external means operating the inner member.

A further object is to provide a seal means which can be used effectively between stationary parts.

These and other objects will be apparent from the drawings. Referring to the drawings.

Figure 1:
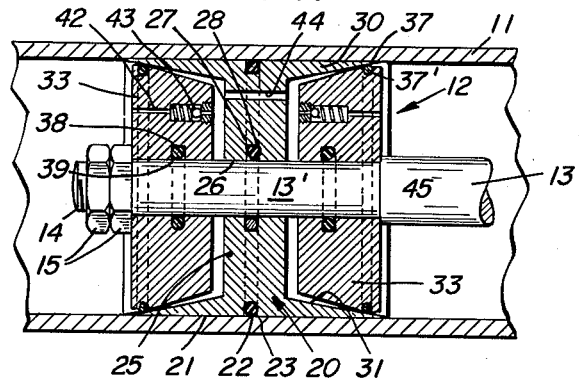
Fig. 1 is a fragmentary sectional view of a cylinder in which there is shown in section a piston construction embodying the invention.
Figure 10:
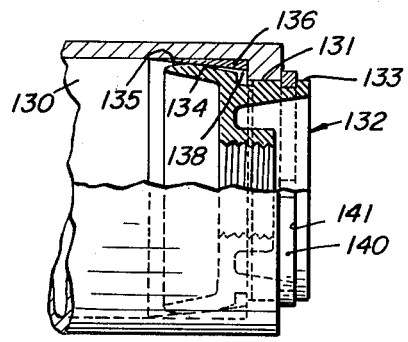
Figure 11:
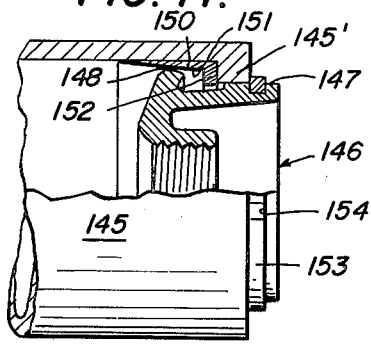

Figs. 6, 7, and 8 are views similar to Fig. 1 but each showing another embodiment of the invention;

Fig. 9 is a fragmentary sectional view of seal means embodying the invention between a cylinder and a rod or shaft;

Fig. 10 is a sectional view of the end of a cylinder showing alternate means for sealing an end closure therein;

Fig. 11 is a view similar to Fig. 10 showing another form of sealing means; and

Figure 12:
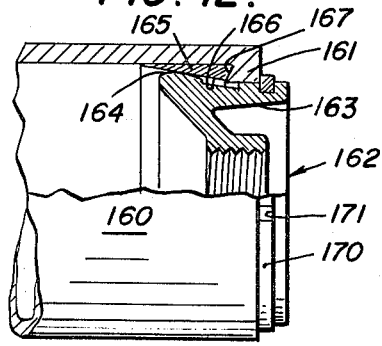

Fig. 12 is a view similar to Fig. 10 showing still another modification.

More particularly describing the invention, it is known that metal which possesses elasticity can be flexed literally millions of times as long as the metal is not flexed to or beyond its elastic limit. I utilize this quality of metal to produce a seal construction in which a cylindrical element of a multipart member, such as a piston, or a metal seal ring, is automatically flexed outwardly (within its elastic limit) into sufficiently close engagement with another member, such as a cylinder, to provide the degree of seal required between the parts in a working piston and cylinder assembly or between relatively stationary parts. Referring to the drawings, I show a cylinder 11 containing a piston 12. The construction includes a piston rod 13 which is threaded at 14 to accommodate nuts 15 which act as a securing means for the various parts. Other conventional types of securing means may be used if desired.

My construction includes an outer element or outer piston member, designated 20, which is mounted upon a reduced portion 13' of the piston rod. Member 20 is made of metal and is adapted to freely but relatively closely fit within the cylinder 11 for sliding engagement with the inner surface thereof. The outer surface or periphery of member 20, designated 21 is cylindrical although it is shown interrupted by a peripheral groove 22 which may contain a wiper ring 23. The groove 22 and ring 23 are not essential, however. Member 20 includes a central, annular body 25 which is centrally bored at 26 to receive the piston rod 13. A seal ring 27 may be provided in a groove 28 in the inner face of body 25. Extending axially from each side of the central body 25 is a tapering end portion or skirt 30 which is defined by the gradually inclined conoidal surface 31 and the peripheral surface 21. The surfaces 21 and 31 provide relatively thin edge portions at each end of the outer member 20.

Figure 2:
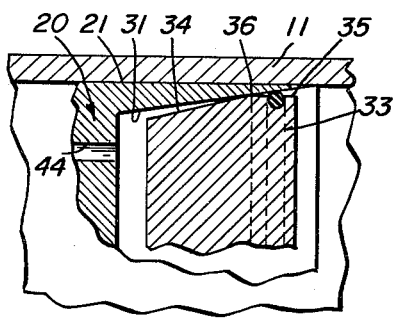
Fig. 2 is an enlarged fragmentary sectional detail view of a portion of the apparatus shown in Fig. 1, the view being in the same plane as Fig. 1.

Within each end of the outer member 20 I provide an inner member 33 which is used for expanding the thin end edge portion of the outer member sufficiently to reduce the clearance between the outer member and the cylinder wall to that required for the particular application. Each inner member 33 is characterized by having peripheral surfaces 34 and 35 which intersect at a circular region 36 to provide line contact between the inner member and the associated conoidal or tapered surface 31 of the outer member. The surfaces 34 and 35 preferably diverge slightly from the surface 31 as best shown in Fig. 2. If desired, the members 33 may be slightly rounded at the intersection line 36 of surfaces 34 and 35. In either case, the line or area 36 is in essence an annular fulcrum for the engagement and bending of the outer seal member, as will later appear.

Means are provided for effecting a fluid seal between each of the members 33 and the outer member and between each of members 33 and the piston rod. This means may take the form of a seal ring 37 in a peripheral groove 37' and a seal ring 38 in an inner groove 39 in the inner surface of member 33.

In the form of the invention shown in Fig. 1 the elements 20 and 33 are mounted upon a reduced portion 13' of the piston rod for axial movement relative thereto. Movement of the members 33 is limited at their outer ends by the nuts 15 in one case and a shoulder 45 on the piston rod in the other case.

In the operation of the device it is to be understood that the parts are assembled so that the inner members 33 normally do not cause any expansion of the outer member which in turn is normally fitted with some clearance between it and the cylinder. However, with the application of fluid pressure against either of the members 33 that particular member will be forced inwardly of the outer member to slightly expand the thin edge portion of the outer member into sealing engagement with the cylinder wall. By way of example, if the cylinder has an internal diameter of about two inches, the outer member 20 may have a normal outer diameter of about .002 inch less, providing a clearance of .0001 inch. If the piston is used in a pump and the rod 13 is driven, the whole assembly will be pulled forward by the trailing inner member 33 which will thus tend to enter the trailing end of the outer member and expand it as well as tend to cause the other inner member 33 to expand the forward end of the outer element.

In some instances it may be desirable to provide against the possibility of the entrapment of pressure fluid behind the inner members. To accomplish this, each inner member is shown constructed to provide a fluid escape passage 42 which is controlled by a check valve 43, opening outwardly or toward the outer end of the member. Also the body 25 of the outer member 20 is provided with a port or passageway therethrough, designated 44. In many installations the passages through the members 33 would be unnecessary, especially where a passage 44 is provided through member 20.

Figure 3:
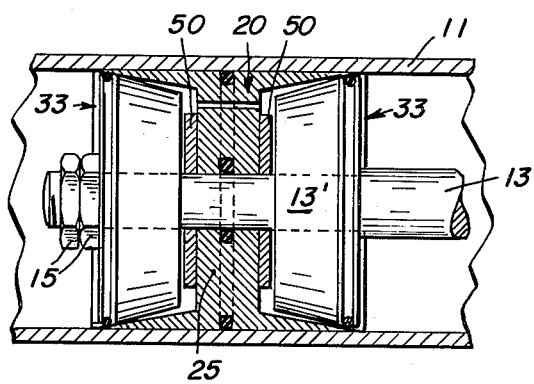
Fig. 3 is a view similar to Fig. 1 but disclosing a modified form of the invention.

It may also be desirable in some instances to limit the travel of members 33 relative to the outer member 20 and to accomplish this I may provide a pair of washers 50 (Fig. 3) between each member 33 and the central portion 25 of the outer element. The washers may be of a thickness to leave the desired clearance space for relative axial movement of the parts.

Figure 4:
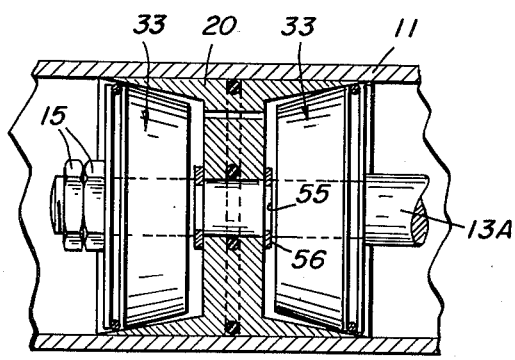
Fig. 4 is a view similar to Fig. 1 but showing still another modification.

It may also be desirable in some instances, particularly where the piston rod is driving the piston, to secure the outer member 20 against axial movement relative to the piston rod and for this purpose in Fig. 4 I show a rod 13A provided with grooves 55 adapted to accommodate split rings 56 which serve to lock the outer member in place.

Figure 5:
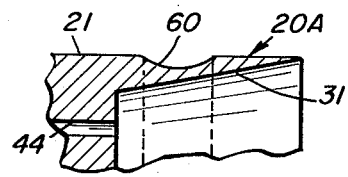
Fig. 5 is a fragmentary detailed sectional view similar to Fig. 2 but showing a modified outer member.

I may also make the outer member somewhat more flexible as may be required for certain metals by providing an area of reduced cross section spaced axially from the thin edge portion of the end of the outer element. Thus in Fig. 5, by way of example, I show an outer element, designated 20A which is provided with a shallow, rather wide peripheral recess 60 for this purpose. The opposite end of the outer member may also be provided with the same construction.

While I have shown a double-ended piston, I may use a construction wherein only one end of the outer element of the piston is expanded, thus entailing the use of only one of the inner members 33. The other end of the outer member may then be constructed in any desired manner and as a practical matter, the entire portion beyond the central body 25 could be eliminated. This will become apparent from other forms of the invention later to be described.

Referring now to Fig 6, I show a form of the invention which is generally similar to that shown in Fig. 1, but differs therefrom in that the piston member is formed with an outer member consisting of two parts 51 and 52. One of these is provided with a peripheral recess 51' to accommodate a C type continuous wiper ring and with an inner groove 54 to accommodate seal ring, designated 55.

For the purpose of venting fluid to opposite sides of the members 51 and 52 one of these members is provided with an annular groove 57 and a port or passage 58. The other member may merely have a passage 59 which registers with groove 57.

The advantage of the construction shown in Fig. 6 is that it enables the use of continuous, relatively non-expansible wiper or seal rings which could not be assembled on and within the single-piece type of piston member.

Referring to Fig. 7, I show another form of the invention which comprises a piston assembly 62 shown in a cylinder 63. The assembly 62 is mounted upon a piston rod 64 which is provided with a head 65 at its end and with a threaded portion 66 spaced therefrom. Mounted on the rod is a single-ended outer member comprising a disk-like body 68 and a tapered, laterally extending skirt portion 69. An inner member 71 is provided between head 65 and member 68. The latter is retained by nuts 73. The inner member may be of substantially the same construction as the inner members 33 previously described. However, I have shown the outer end of member 71 provided with a groove 75 to accommodate the seal ring 76. The member 68 has a similar groove 78 to receive the ring 79.

In Fig. 8 I show an assembly which is designed particularly for use where the piston rod, designated 80, is more in the nature of a connecting rod and must necessarily pivot with reference to the piston assembly 82. The latter comprises an outer member 84 of cylindrical disk form provided with the axially extending tapered skirt or end portion 86 into which fits the inner member 87. The two parts are held together by suitable bolts 90 and these may be adjusted sufficiently either to slightly expand the skirt 86 or to a point just short of this. The bolts are slidable in member 84. The end of the rod 80 is shown provided with a ball-like enlargement 92 which is received between members 84 and 87, the latter having the semicircular faces 93 and 94, respectively, to receive the member. The parts are adjusted and related so the ball end 92 of the rod is not clamped against movement.

The forms shown in Figs. 7 and 8 are examples of single-ended outer piston members having but a single thin end portion or skirt. The mode of operation is essentially the same as the devices previously described and in this connection I may provide a relief or vent passage through the body of the inner member if desired.

While I have shown the invention with particular reference to relatively moving parts, I also contemplate that the invention is useful for effecting a seal between parts which are normally stationary. An example of this is shown in Fig. 9. Referring thereto I show a cylinder 100 which has a counterbore 101 threaded at 102. This receives a tapered sleeve 104 which is essentially the same as one of the tapered end or skirt portions of the outer piston members previously described. Inwardly of this is a plug 106, the periphery of which is provided with the tapered or conoidal surfaces 107 and 108. The plug 106 is provided with a central opening formed by the tapered or conoidal surfaces 110 and 111 and by a threaded bore 112. Surfaces 107 and 108 meet at 114 to provide an annular line portion for contact with the inner tapered surface of member 104.

A second seal member or sleeve 115 is provided about a shaft 116. Member 115 has a tapered or conoidal outer surface 118 against which the region 119 of the plug 106 bears. A nut 121 threads into the member 106 and can be adjusted to cause member 106 to bear upon sleeve 115 with the desired amount of pressure. Sleeve 104 is adjusted by means of a nut 123. Thus the sleeves are slightly expanded into sealing relation with the adjacent wall.

As previously pointed out, in all forms of my invention I rely upon a flexing of a metal possessing elasticity to achieve a seal between the flexed member and another member. Also, as pointed out hereinbefore, the metal should not be flexed quite up to its elastic limit. In order to insure that the metal is not flexed unduly, I preferably design each particlular member for the pressure and force conditions to be met so that the force or pressure to be exerted will be insufficient to over-flex the metal. By varying the thickness and taper of the sealing skirt or other seal member or portion, I can control the flexibility of the member. Also, I may guard against over-flexing by insuring that the member to be flexed has only a limited clearance space between it and the part against which it is to seal.

While I have shown and described certain embodiments of the invention, I contemplate that various changes and modifications can be made therein without departing from the scope of the invention as set forth in the claims. By way of example, three further forms of the invention are shown in Figs. 10–12. Referring to Fig. 10, I show a cylinder 130 having an inwardly extending flange 131 at one end. Mounted in the end of the cylinder is a closure 132 which is provided with a cylindrical peripheral surface 133 for reception within the flange of the cylinder. Member 132 has an enlarged skirt 134 with a somewhat rounded peripheral surface 135 for engagement with a metal seal ring 136 having a conoidal or tapered inner surface 138.

It may be assumed that the closure is inserted in the cylinder from the opposite end thereof (not shown) and brought to the position shown and firmly seated against the seal ring 136 sufficiently tightly to expand the ring into sealing engagement with the cylinder. The parts are secured by a split lock ring 140 in groove 141 in the member 132. In this and the two subsequent views the end closure member is provided with a centrally threaded opening, but this is of no consequence to the invention, and it may be assumed that this would be closed or that a conduit would be mounted therein. Thus, fluid pressure within the cylinder would tend to increase the sealing effect as it tended to move the end closure outwardly of the end of the cylinder and thus more firmly into engagement with the seal ring.

In Fig. 11 I show a cylinder, designated 145, having an internal flange 145' at its end. Mounted in the end of the cylinder is closure 146 having a cylindrical peripheral surface 147. The inner portion of the member 146 is formed to provide a rounded surface 148 for engagement with a seal ring 150 having a tapered or conoidal surface 151. This seal ring has a flange 152, the internal diameter of which is slightly less than the external diameter of the surface 147 whereby the seal ring is maintained assembled with the closure 146 when the parts are not in use. It will be recognized that the parts may be assembled by expanding the seal ring and/or contracting the end closure. The end closure is secured by a split lock ring 153 in a groove 154. The form of the invention shown in Fig. 11 operates in the same manner as that in Fig. 10.

In Fig. 12 I show a cylinder 160 with an inwardly extending flange 161 at the end. A closure 162, which is generally similar to those shown in Figs. 10 and 11, is provided. The latter has a cylindrical peripheral surface 163 for reception in the end of the cylinder. At its inner end portion the member 162 has a peripheral surface 164 for engagement with the seal ring 165. The latter has a tapered or conoidal inner surface 166.

In this form of the invention the seal ring and flange of the cylinder are formed to provide correspondingly angularly disposed surfaces, designated 167, which, in cross section, form an acute angle with the interior surface of the cylinder. This construction results in reinforcing the cylinder under conditions of high pressure. The closure is retained by a split lock ring 170 in a groove 171. The function of the parts in Fig. 12 is substantially the same as those in Figs. 10 and 11.

It will be apparent that, in all forms of the invention, the member which is used to flex the seal member provides a narrow annular area or line of contact with a tapered surface of the seal member whereby, in use, the seal member is flexed over this narrow area or line of contact and such narrow area or line of contact serves as a fulcrum for the flexing of the seal ring.

I claim:

1. In a piston construction, a piston rod, an outer member on said rod, said outer member being of metal possessing elasticity and having a cylindrical outer surface for sliding engagement with the interior of a cylinder, said outer member being formed to provide a conoidal inner surface at at least one end substantially intersecting said peripheral surface and therewith defining a thin edge at the end of the outer member, and a relatively rigid inner member on said rod between the same having an axially narrow annular contact area said conoidal surface and engaging said conoidal surface, one of said inner and outer members being mounted for axial movement whereby to enable the inner member to flex said outer member with said annular contact area serving as a fulcrum thereby to expand said outer member at the thin edge end thereof when urged axially inwardly of said outer member by fluid pressure or other means.

2. A piston construction as set forth in claim 1 in which fluid seal means is provided between said inner member and said outer member and between said inner member and said rod.

3. A piston construction as set forth in claim 1 in which means is provided for limiting relative axial movement of said inner and outer members in a direction of movement of the inner member into the outer member.

4. A piston construction as set forth in claim 1 in which said outer member is secured against axial movement relative to said piston rod.

5. A piston construction as set forth in claim 1 in which said inner member is characterized by a pair of intersecting peripheral surfaces defining a circular line contact area therebetween for engagement with said outer member, said intersecting peripheral surfaces diverging from the conoidal surface of said outer member.

6. A piston construction as set forth in claim 1 in which fluid seal means is provided between said inner member and said outer member and between said inner member and said rod and in which said inner member is provided with a check-valve-controlled passage permitting passage of fluid through said member in a direction from its inner to its outer end.

7. A piston construction as set forth in claim 1 in which said outer member is formed to provide a region of reduced cross-sectional area spaced inwardly a short distance from said thin edge.

8. A piston construction as set forth in claim 1 in which said outer member has a shallow groove in its periphery in a region spaced inwardly a short distance from said thin edge.

9. In a piston construction, a piston rod, an outer member on said rod, said outer member being of metal possessing elasticity and having a cylindrical outer surface for sliding engagement with the interior of a cylinder, said outer member being formed to provide a thin edge portion at each end, each said thin edge portion being defined by the periphery of said member and by a conoidal inner surface of said outer member, and a pair of relatively rigid inner members on said rod within the respective ends of said outer member and having axially narrow annular contact areas engaging the respective conoidal surfaces of said outer member, said inner members and said outer member being mounted for relative axial movement whereby to enable said inner members to flex said outer member with said annular contact areas serving as fulcrums thereby to expand said thin edge portions of said outer member when said inner members are urged axially inwardly of said outer member by fluid pressure or other means.

10. A construction as set forth in claim 9 in which a fluid seal is provided between each inner member and the outer member and between each inner member and the piston rod.

11. A construction as set forth in claim 9 in which said outer member is secured against axial movement relative to said piston rod.

12. A construction as set forth in claim 9 in which means is provided for limiting relative movement of said inner members with respect to said outer member.

13. A construction as set forth in claim 9 in which a fluid seal means is provided between each inner member and the outer member and between each inner member and the piston rod, and in which a vent passage is provided through said outer member between said inner members.

14. A construction as set forth in claim 9 in which a vent passage is provided through said outer member between said inner members.

15. A construction as set forth in claim 9 in which a fluid seal means is provided between each inner member and the outer member and between each inner member and the piston rod, and in which a vent passage is provided through said outer member between said inner members and in which each inner member is provided with a check-valve-controlled passage therethrough for passage of fluid from the inner to the outer end thereof.

16. Means for effecting a seal with a member providing a primary cylindrical surface, comprising a seal member of metal possessing elasticity and formed to provide an annular thin-walled section terminating in a relatively thin edge at its end, said section providing a cylindrical surface on one side adapted to be juxtaposed with relation to said primary cylindrical surface and providing a tapered surface on the other side, a relatively rigid seal member-engaging member formed to provide a narrow annular area in engagement with the tapered surface of said seal member, said seal member and said member-engaging member being mounted to permit of being moved relatively axially to a limited extent whereby said narrow annular area serves as a fulcrum for the flexing of said thin-walled section towards said primary cylindrical surface through engagement of said seal member and seal member-engaging member and upon relative movement of said last two members in a given direction.

17. Means as set forth in claim 16 in which the normal clearance space between said primary cylindrical surface and said seal member is insufficient to permit of said seal member being flexed to its limit of elasticity.

18. In a seal construction as described, a cylinder a metal seal ring possessing elasticity within said cylinder, said seal ring being characterized by a cylindrical outer surface and a tapered inner surface defining a relatively thin edge at one end of said ring, means on said cylinder limiting movement of said ring axially in a direction away from its thin edge end, an inner member within said cylinder having an annular portion engaging said inner surface of said seal ring at a region inwardly of the end thereof sufficiently firmly to expand a portion of said ring within the limit of elasticity of the metal into sealing engagement with said cylinder, and interengaging means on said cylinder and said inner member anchoring said inner member against movement in a direction which would permit return of the expanded portion of the seal ring to normal.

19. A construction as set forth in claim 18 in which said cylinder has an internal shoulder against which said seal ring is seated.

20. A construction as set forth in claim 18 in which said cylinder has an internal shoulder against which said seal ring is seated and in which said shoulder forms an acute angle with the inner surface of the cylinder.

21. A construction as set forth in claim 18 in which said seal ring is provided with an internal flange and in which said inner member has a peripheral recess loosely receiving the flange of said seal ring whereby the seal ring and inner member are loosely assembled together.

22. Means for effecting a seal against a member providing a primary cylindrical surface, comprising a metal seal member possessing elasticity characterized by having an annular thin-walled section terminating in a relatively thin edge at its end, said section providing a cylindrical surface on one side adapted to be juxtaposed with relation to said primary cylindrical surface and a tapered surface on the other side, a relatively stiff seal member engaging member of annular shape having an annular fulcrum portion of limited axial extent in engagement with the tapered surface of said seal member at a region inwardly of the end thereof, and means limiting relative axial movement of said seal member and said seal member engaging member in a direction which would permit the same to separate, said seal member being flexed in the region of its thin-walled section about said fulcrum portion of said seal member engaging member as a result of relative axial movement between said seal member and said seal member engaging member in a direction opposite to said aforementioned direction.

23. In a seal construction, a cylinder, a metal seal ring possessing elasticity within said cylinder, said seal ring being characterized by a cylindrical outer surface and a tapered inner surface defining a relatively thin edge at the inner end of said ring, a retaining ring threadedly mounted on said cylinder and abuttingly engaging the outer end of said seal ring, an inner member within said cylinder having an annular fulcrum portion of limited axial extent engaging said tapered inner surface of said seal ring inwardly of the end thereof sufficiently firmly to expand a portion of said ring within the limit of elasticity of the metal into sealing engagement with said cylinder, and interengaging means on said cylinder and said inner member anchoring said inner member against movement in a direction which would permit return of the expanded portion of the seal ring to normal.

24. In a seal construction, a cylinder, a first metal seal ring possessing elasticity within said cylinder, said seal ring being characterized by a cylindrical outer surface and a tapered inner surface defining a relatively thin edge at one end of said ring, means on said cylinder limiting movement of said ring axially in a direction away from its thin edge end, an inner member within said cylinder having an annular fulcrum portion providing line contact with said inner surface of said seal ring at a region inwardly of the end thereof sufficiently firmly to expand a portion of said ring within the limit of elasticity of the metal into sealing engagement with said cylinder, interengaging means on said cylinder and said inner member anchoring said inner member against movement in a direction which would permit return of the expanded portion of the seal ring to normal, said inner member having an opening, the portion of said inner member defining said opening being formed to provide an annular portion of least diameter having relatively limited axial extent, a shaft freely received in said opening, a second metal seal ring within said opening and surrounding said shaft characterized by a cylindrical inner surface and a tapered outer surface defining a relatively thin edge at its inner end, and a gland threadedly mounted on said inner member engaging the outer end of said second seal ring and effective to axially adjust the same relative to said inner member in a manner to contract a portion of said second seal ring into engagement with said shaft.

25. Means for effecting a seal with a member providing a circular face, comprising an annular seal ring of metal possessing elasticity and formed to provide an inner surface and an outer surface, one of said surfaces being sized to be juxtaposed to said circular face in close but non-sealing relation thereto and the other of said surfaces being inclined relative to said one surface for at least a portion of its axial extent, and a relatively rigid seal member-engaging member formed to provide an axially narrow annular contact area for engagement with the inclined portion of said other surface of said seal ring at a region spaced inwardly of the end thereof, said seal ring and said seal ring-engaging member being mounted to permit of relative axial movement whereby to enable said seal ring-engaging member, upon application of force, to flex said seal ring into sealing engagement with said circular face, with said annular contact area serving as a fulcrum over which said seal ring is flexed.

26. The seal means set forth in claim 25 in which means is provided for causing said relative axial movement between said seal ring and seal ring-engaging member and for adjustably retaining said members in a given position with said seal member flexed into sealing engagement with said circular face.

References Cited in the file of this patent

UNITED STATES PATENTS

| | | |
|---|---|---|
| 2,480,633 | Christensen | Aug. 30, 1949 |
| 2,487,512 | Berger | Nov. 8, 1949 |
| 2,574,109 | Kane et al. | Nov. 6, 1951 |
| 2,785,026 | Barnhart | Mar. 12, 1957 |
| 2,828,170 | Badgley | Mar. 25, 1958 |

FOREIGN PATENTS

| | | |
|---|---|---|
| 822,572 | France | Jan. 4, 1938 |